United States Patent
Laughton (10) Patent No.: US 10,423,346 B2
(45) Date of Patent: Sep. 24, 2019

(54) PARAMETER STORAGE MANAGEMENT

(71) Applicant: ARM Limited, Cambridge (GB)

(72) Inventor: Arthur Brian Laughton, Hathersage (GB)

(73) Assignee: ARM Limited, Cambridge (GB)

( * ) Notice: Subject to any disclaimer, the term of this patent is extended or adjusted under 35 U.S.C. 154(b) by 189 days.

(21) Appl. No.: 15/430,824

(22) Filed: Feb. 13, 2017

(65) Prior Publication Data

US 2018/0232168 A1    Aug. 16, 2018

(51) Int. Cl.
*G06F 1/32* (2019.01)
*G06F 3/06* (2006.01)

(52) U.S. Cl.
CPC ............. *G06F 3/0625* (2013.01); *G06F 1/32* (2013.01); *G06F 3/065* (2013.01); *G06F 3/067* (2013.01); *G06F 3/0619* (2013.01)

(58) Field of Classification Search
CPC .................................................... G06F 3/0625
See application file for complete search history.

(56) References Cited

U.S. PATENT DOCUMENTS

2012/0054441 A1*  3/2012  Nakashima ......... G06F 11/1441
                                                          711/124
2016/0202673 A1*  7/2016  Ehtemam-Haghighi ...................
                                                          G06F 1/3287
                                                          700/275

* cited by examiner

*Primary Examiner* — Kim Huynh
*Assistant Examiner* — Eric Chang
(74) *Attorney, Agent, or Firm* — Nixon & Vanderhye P.C.

(57) ABSTRACT

An apparatus for processing data 2 contains multiple power domains which may be in a non-retaining power state or a retaining power state. If a power domain is in a non-retaining power state in which it is not able to retain a copy of a stored parameter value and it is switched into a retaining power state in which it requires a copy of that parameter value, then it fetches the parameter value from a store within another power domain. One of the power domains contains a master copy of the parameter value to which writes changing in the parameter value are made. At least one of the other power domains fetches a copy of the parameter value if required from a power domain other than the power domain containing the master copy.

16 Claims, 6 Drawing Sheets

PARAMETER STORAGE MANAGEMENT

BACKGROUND

Field

This disclosure relates to the field of data processing systems. More particularly, this disclosure relates to the field of data processing systems including multiple power domains which may be placed into respective different power states including non-retaining power states in which stored parameter values are not retained.

Description

It is known to provide data processing systems, such as system-on-chip integrated circuits, which include a plurality of power domains which may be switched between different power states in order to manage the power consumption of the integrated circuit. For example, portions of the integrated circuit, which provide functionality not required at a given point in time, are disposed within their own power domain that can be placed into a low power consumption state when those portions are not required. Some of the power states in which a portion (domain) of the integrated circuit may be placed are non-retaining power states, i.e. stored dynamic state within that domain is lost when the domain is in the non-retaining power state. When such a power domain changes from a non-retaining power state to a retaining power state, state data which has been lost may be reloaded into in the power domain concerned. It may be desirable to keep local copies of certain configuration data within each power domain, e.g. for performance reasons of speeding up access to that data, and/or to ensure that the domain concerned has access to that data without depending upon other intervening power domains to be in a suitable power state. The mechanisms required to support the provision of multiple stored copies of a parameter value within different respective power domains should desirably themselves consume little overhead and introduce little delay in the operation of the apparatus, e.g. require relatively little circuitry and not slow down switching between power states.

SUMMARY

Viewed from one aspect the present disclosure provides an apparatus for processing data comprising:

a first power domain comprising a master store to store a master copy of a parameter value and to which writes changing said parameter value are performed; and a plurality of further power domains, each of said further power domains having a plurality of power states comprising a non-retaining power state in which a slave store storing a slave copy of said parameter value does not retain said slave copy and a retaining power state in which said slave store retains said slave copy for use within said further power domain; wherein at least one of said further power domains comprises parameter value fetching circuitry to fetch, upon changing from said non-retaining power state to said retaining power state, a copy of said parameter value along a path from a slave store within another of said plurality of further power domains.

In another aspect the present disclosure provides a method of processing data comprising the steps of:

storing in a master store of a first power domain a master copy of a parameter value;

performing writes changing said parameter value to said master store; and operating a plurality of further power domains, each of said further power domains having a plurality of power states comprising a non-retaining power state in which a slave store storing a slave copy of said parameter value does not retain said slave copy and a retaining power state in which said slave store retains said slave copy for use within said further power domain; wherein fetching circuitry within at least one of said further power domains fetches a copy of said parameter value along a path from a slave store within another of said plurality of further power domains when said at least one further power domain changes from said non-retaining power state to said retaining power state.

The above, and other objects, features and advantages of this disclosure will be apparent from the following detailed description of illustrative embodiments which is to be read in connection with the accompanying drawings.

EMBODIMENTS

Figure 1:
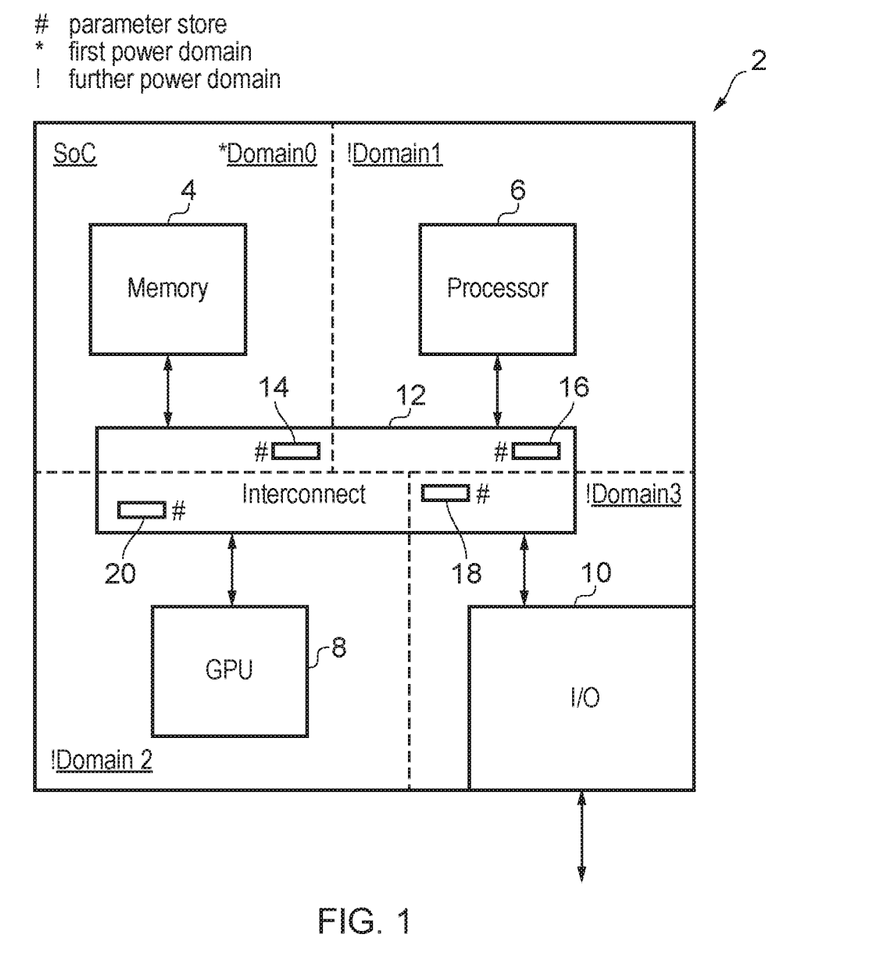
FIG. 1 schematically illustrates a data processing apparatus incorporating multiple power domains.

FIG. 1 schematically illustrates a data processing apparatus in the form of a system-on-chip integrated circuit 2 incorporating a plurality of power domains. These power domains comprise, in this example embodiment, a first power domain, namely Domain 0 and three further power domains, namely Domain 1, Domain 2 and Domain 3. As illustrated in FIG. 1, each of these different power domains includes respective functional circuitry, such as a memory 4, a processor 6, a graphics processing unit 8 and input/output circuitry 10. The memory 4, the processor 6, the graphics processing unit 8 and the input/output circuitry 10 communicate via interconnect circuitry 12. Different portions of the interconnect circuitry 12 lie within different respective domains. The boundaries between the domains are illustrated by the dashed lines in FIG. 1. Each of the respective portions of the interconnect circuitry 12 includes a respective configuration register (store) 14, 16, 18, 20 storing a copy of a parameter value in the form of a configuration value, such as, for example, the debug status of the integrated circuit 2, the current security state (e.g. ARM S bit) within which integrated circuit 2 is operating. The parameter value represents a global parameter which is set for the integrated circuit 2 as a whole. The respective configuration registers 14, 16, 18, 20 each store a local copy of the parameter value concerned. The configuration register 14 within the first power domain (Domain 0) stores a master copy of the parameter value and the register 14 can be considered a master store. The registers 16, 18 and 20 within the further domains (Domain 1, Domain 2, and Domain 3) store slave copies of the parameter value held within the master register 14. When a write is made to change the parameter value, this write is made to the master copy of the parameter value in the register 14 of the first domain and is then propagated to each of the register 16, 18, 20 of the further domains so that they are in turn updated. If the domain containing a slave store in the form of one of the registers 16, 18, 20 is in a non-retaining power state when such an update reflecting a write of the parameter value is to be made, then in some example embodiments the domain concerned is woken up, i.e. switched to a retaining power state such that the update to the slave copy of the parameter value may be made. In other example embodiments the propagation of the newly written parameter value may be made to the slave stores within those power domains which are currently in a retaining power state and is not made to the power domains which are in a non-retaining power state. The non-retaining power state domains in this circumstance later fetch an up-to-date copy of the parameter value when they are switched to a retaining power state, i.e. they fetch the up-to-date version of the parameter value when they are powered up and may need that parameter value.

Each of the portions of the interconnect circuitry 12 in a respective power domain as illustrated in FIG. 1 includes fetching circuitry which serves to fetch a copy of the parameter value from another of the power domains when its own power domain is switched from a non-retaining power state to a retaining power state, i.e. the fetching circuitry fetches the parameter value which it has lost due to its lower power (non-retaining) state when it is powered up again. The fetching circuitry associated with at least one of the further power domains Domain 1, Domain 2 and Domain 3 is arranged to fetch its parameter value in these circumstances from another one of the further power domains (Domain 1, Domain 2 or Domain 3) rather than from the first power domain (Domain 0) which contains the master copy. In at least some example embodiments, by fetching the parameter value from one of the further power domains rather than from the first power domain (i.e. from a slave store rather than from the master store), a more rapid access to the parameter value may be made, congestion at the master store may be avoided and the potential need to power up intervening power domains to reach the master store may be avoided.

Figure 2:
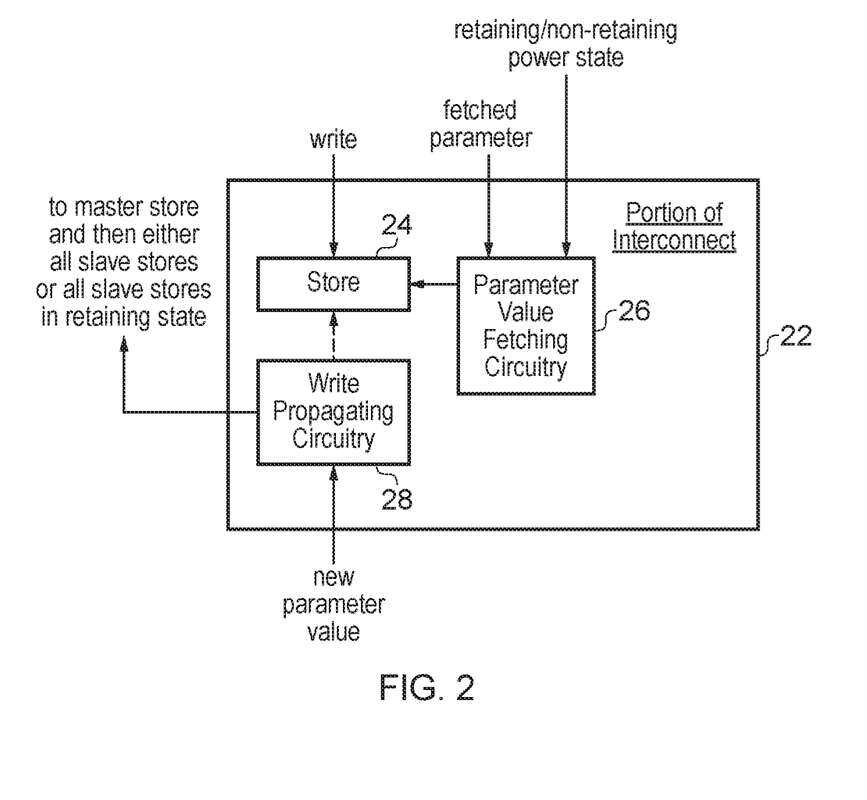
FIG. 2 schematically illustrates a portion of interconnect circuitry responsible for managing local storage of a parameter value.

FIG. 2 schematically illustrates a portion of interconnect circuitry 22 from within each of the power domains of FIG. 1. This portion 22 includes a store 24 for the parameter value, parameter value fetching circuitry 26 responsible for performing the fetch of the parameter value as previously discussed when the corresponding power domain switches from a non-retaining power state to a retaining power state, and write propagating circuitry which serves to propagate any write of a new parameter value to the store 24 back to the master store and either to all other slave stores, or all other slave stores currently in a retaining power state as previously discussed. The parameter value fetching circuitry 26 is supplied with a signal indicating whether its corresponding power domain is currently in a retaining power state or a non-retaining power state and accordingly is able to trigger the parameter fetching when the power domain changes from a non-retaining power state to a retaining power state. As previously discussed the source from which the parameter value fetching circuitry 26 fetches the parameter value will for at least one of the further power domains which does not store the master copy be taken from another of the further power domains, i.e. the parameter value will be fetched from a slave store for at least one power domain rather than being fetched from the master store.

Figure 3:
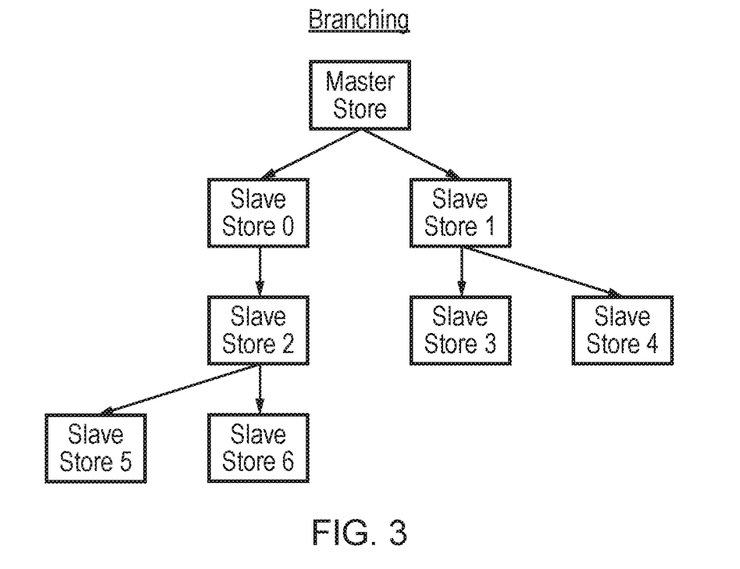
FIG. 3 schematically illustrates a branching path arrangement for fetching copies of a stored parameter value.

It will be appreciated that the paths along which the parameter values may be fetched and the relationship between the paths can take a variety of different forms. FIG. 3 schematically illustrates an arrangement in which the paths along which the parameter values are fetched form branching paths. As will be seen, two of the slave stores, namely slave store 0 and slave store 1, fetch their parameter value from the master store. Slave stores 2 to 6 fetch their parameter values from other slave stores. A branch in the fetching path is present at slave store 1 and slave store 2. The arrangement of the paths via which the parameter values are fetched may be selected in dependence upon a knowledge of how the power control of the associated power domains is in practice performed. As an example, it may be known that the power domains corresponding to slave store 3 and slave store 4 should only be in their retaining power state (i.e. powered up) when the power domain corresponding to slave store 1 is powered up. In this circumstance, the parameter values for restoring to slave store 3 and slave store 4 can efficiently be fetched from slave store 1 as slave store 1 will already be holding such a parameter value (or at least will be in a process of already fetching it itself). Similarly, in the example arrangement of FIG. 3, the power domains corresponding to slave store 5 and slave store 6 are such that they will be in their retaining power state only when the power domain for slave store 2 is also in its retaining power state. Thus, the paths via which the parameter values are fetched among the master store and the various slave stores may be selected and arranged in dependence upon the hierarchy of control of the various corresponding power domains.

Figure 4:
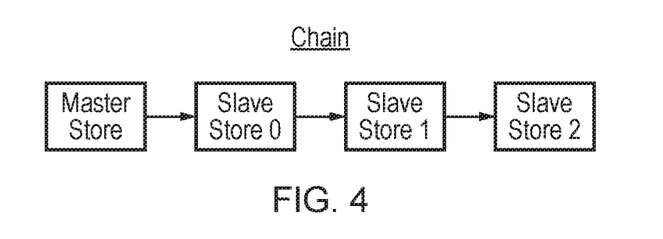
FIG. 4 schematically illustrates a chain path arrangement for fetching copies of a stored parameter value.

FIG. 4 schematically illustrates another form of path arrangement for the fetching of the parameter values. In this case, the paths form a chain in which slave store 0 fetches from the master store, slave store 1 fetches from slave store 0, and slave store 2 fetches from slave store 1. Such an arrangement may be appropriate when, for example, there is a simple hierarchy in the control of the corresponding power domains whereby the power domain for the master store will always be in a retaining power state when the power domain for slave store 0 is in its retaining power state, the power domain for slave store 0 will always be in its retaining power state when the power domain for slave store 1 is in its retaining power state, and the power domain for slave store 1 will be in its retaining power state when the power domain for slave store 2 is in its retaining power state.

Figure 5:
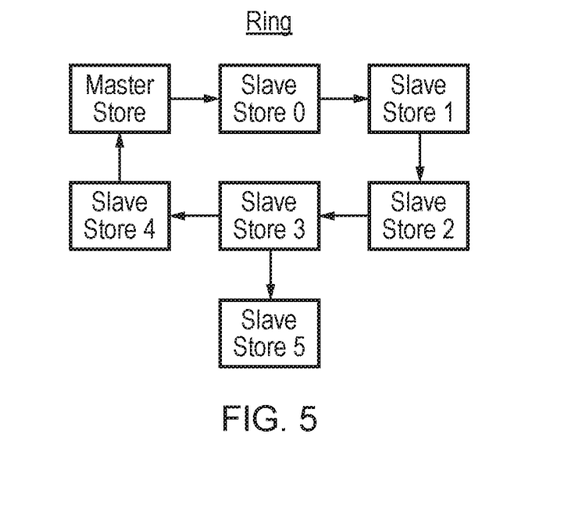
FIG. 5 schematically illustrates a ring path arrangement for fetching a stored parameter value.

FIG. 5 schematically illustrates a further path arrangement which may be used. This arrangement incorporates a ring whereby the master store itself fetches a copy of the parameter value when it changes from a non-retaining power state to a retaining power state from slave store 3. The arrangement permits the power domain containing the master store to be placed into a non-retaining power state providing at least one other of the power domains corresponding to the slave stores within the ring remains in a retaining power state. Slave store 5 is illustrated as fetching its parameter value from a slave store 3 in FIG. 5 showing a branch from the ring arrangement.

The paths for the fetching of parameter values illustrated in FIGS. 3, 4 and 5 may be such that a parameter value is to be fetched from a slave store (or master store) which at the point of time concerned is itself is in a non-retaining power state. In this case, the power domain from which the fetch is to be made is switched into its retaining power state and accordingly is itself triggered to fetch the parameter value from its own specified source of that parameter value. When that parameter value is returned to the now woken up power domain, it can be passed on to the original requesting power domain. In the case of the ring path of FIG. 5 it is possible that all of the power domains on the ring could be in a non-retaining power state and none hold a valid copy of the parameter value. For this reason, the request for a copy of the parameter value that is first issued will be tagged to indicate the originating power domain such that if none of the power domains is in a retaining power state and is holding the parameter value then when that request propagates round the full ring and arrives back at the originally requesting power domain, this is identified and the parameter value can be reinitialised rather than allowing a situation whereby the fetch request continues to propagate round and round the ring.

Figure 6:
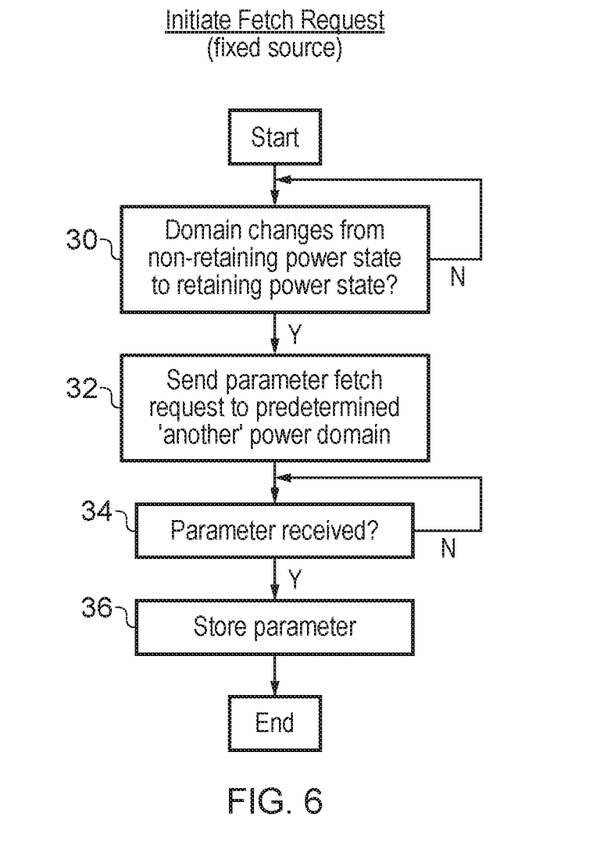
FIG. 6 is a flow diagram schematically illustrating initiation of a fetch request in a system using a fixed source.

FIG. 6 is a flow diagram schematically illustrating the initiation of a fetch request within a system in which the parameter value is fixed for each slave store which may request it. Processing waits at step 30 for the power domain concerned to change from a non-retaining power state to a retaining power state. Step 32 sends a parameter fetch request to a predetermined another domain at step 32. For at least one of the further power domains containing a slave store, this fetch request will be made to another of the power domains which contains a slave store. Processing waits at step 34 until the parameter value is returned. When the parameter value has been returned, then step 36 serves to store this within the local store whether that be a slave store or a master store.

Figure 7:
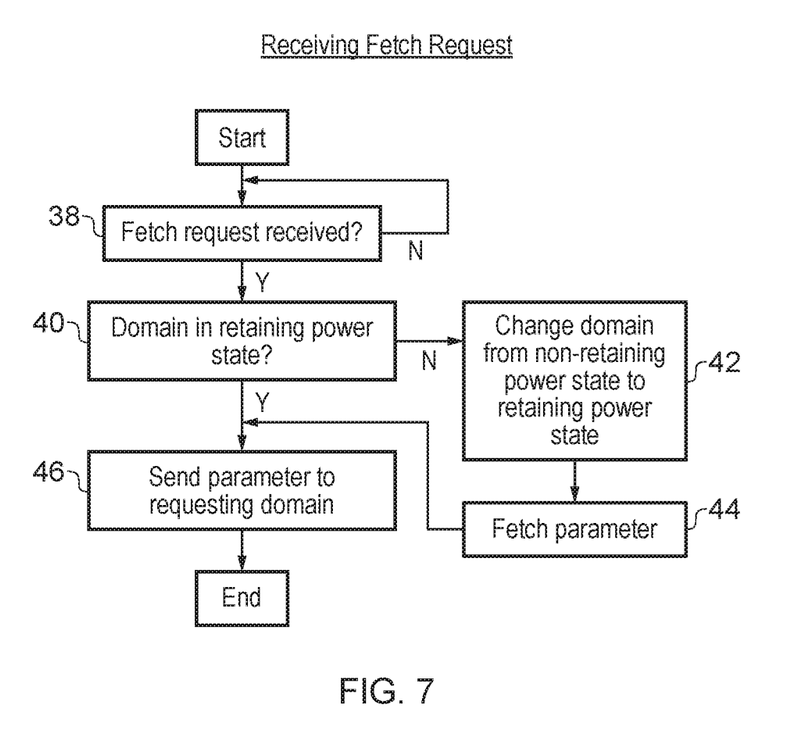
FIG. 7 is a flow diagram schematically illustrating the receiving of a fetch request.

FIG. 7 schematically illustrates how the portion of the interconnect circuitry 22 illustrated in FIG. 2 responds to a fetch request received from another of the power domains. Processing waits at step 38 until such a request is received. Step 40 determines whether or not the power domain which has received the request at step 38 is itself in a retaining power state. If the receiving power domain is not in a retaining power state, then processing proceeds to step 40 at which it changes itself from a non-retaining power state to a retaining power state. After the receiving power domain changes from the non-retaining power state to the retaining power state at step 42, step 44 initiates the fetch of the parameter value for that power domain itself. Such a fetch as illustrated at step 44 will, when the parameter value is returned in response to that fetch at step 44, permit the receiving power domain to service the fetch request which was received at step 38. If the determination at step 40 is that the domain which received the power request at step 38 is already in a retaining power state, then steps 42 and 44 may be bypassed. Step 46 serves to send the parameter value back to the requesting power domain.

Figure 8:
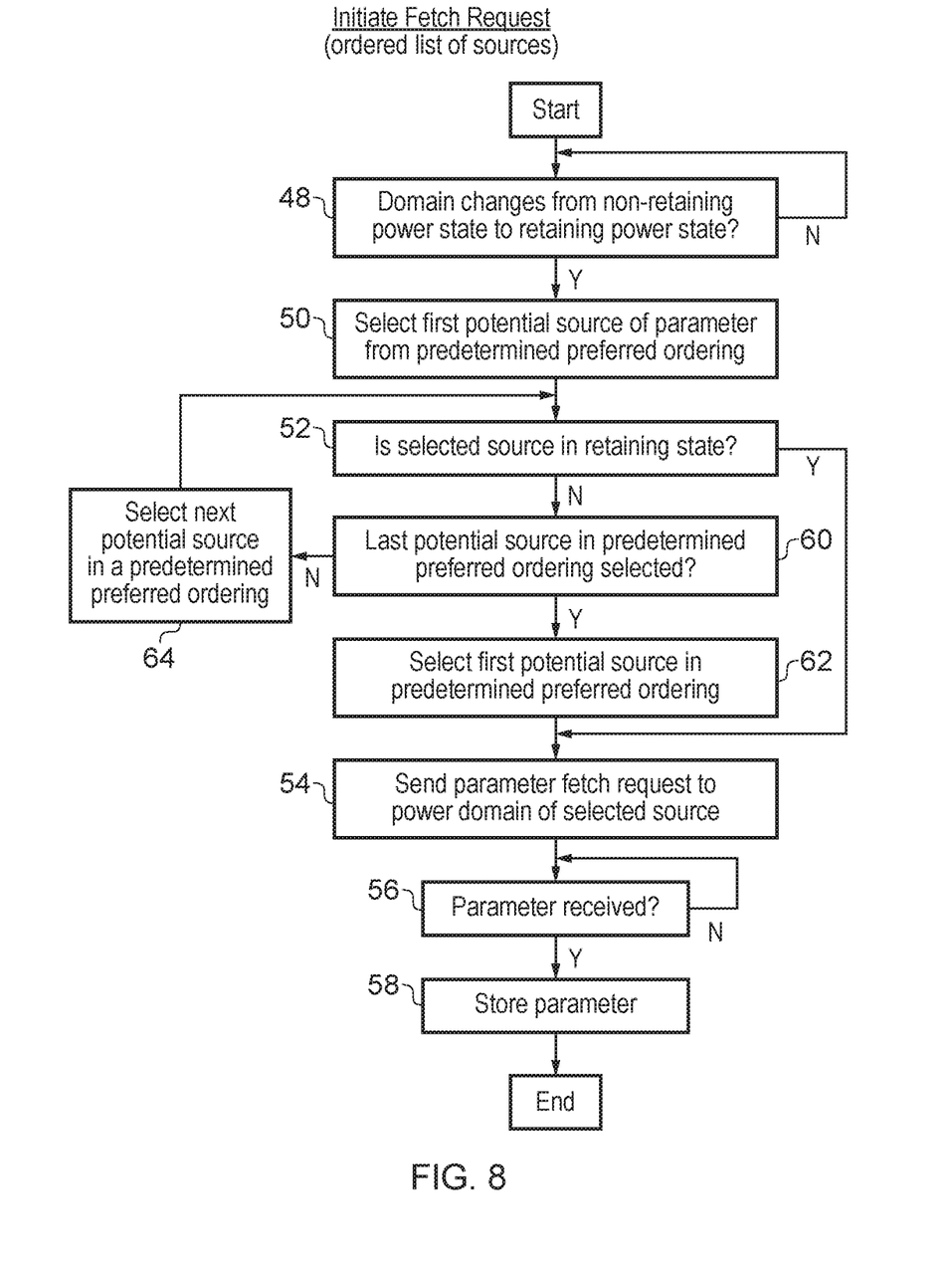
FIG. 8 is a flow diagram schematically illustrating the initiation of a fetch request in a system using an ordered list of sources.

FIG. 8 schematically illustrates a flow diagram corresponding to initiating a fetch request in a system in which an ordered list of potential sources of the parameter value is used by a requesting power domain. Processing waits at step 48 until the requesting power domain changes form a non-retaining power state to a retaining power state. Step 50 serves to select the first potential source of the parameter from the predetermined preferred ordering (list) of sources. This predetermined preferred ordering may, for example, seek to first fetch the required parameter value from an immediately neighbouring power domain, but if this neighbouring power domain does not have the parameter value as it is itself in a non-retaining power state, the list may specify that instead of waking up that neighbouring power domain, the request is instead sent to the first power domain containing the master copy of the parameter value in the master store as, for example, it may be that this first power domain is permanently in the retaining power state. It will be appreciated that this is only one example of how such an ordered list of sources may be arranged and in practice the list may contain a larger number of possible sources arranged in an order appropriate to the desirability of their use.

Step 52 determines whether the selected source of the parameter value from step 50 is in a retaining state, i.e. is able to provide a copy of the parameter value. If the selected source is in the retaining state, then processing proceeds to step 54 where the parameter fetch request is sent to the power domain selected. Processing then waits at step 56 until the parameter value is received back and step 58 stores the received parameter value into the local store for the parameter value.

If the determination at step 52 is that the selected source is not in a retaining power state, then processing proceeds to step 60 where a determination is made as to whether or not the currently selected source is the last potential source in the predetermined preferred ordering (list). If the currently selected source is the last potential source, then processing proceeds to step 62 whereby the first potential source in the predetermined preferred ordering is selected for use even though it is not in a retaining power state. In this case, that first potential source will be woken up and itself fetch the parameter value as discussed in relation to steps 42 and 44 of FIG. 7. If the determination at step 60 is that the currently selected source is not the last in the list, then step 64 serves to select the next potential source in the predetermined preferred ordering (list) and processing is returned to step 52.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

I claim:

1. Apparatus for processing data comprising:
   a first power domain comprising a master store to store a master copy of a parameter value and to which writes changing said parameter value are performed; and
   a plurality of further power domains, each of said further power domains having a plurality of power states comprising a non-retaining power state in which a slave store storing a slave copy of said parameter value does not retain said slave copy and a retaining power state in which said slave store retains said slave copy for use within said further power domain; wherein
   at least one of said further power domains comprises parameter value fetching circuitry to fetch, upon changing from said non-retaining power state to said retaining power state, a copy of said parameter value along a path from a slave store within another of said plurality of further power domains.

2. Apparatus as claimed in claim 1, wherein each of said plurality of further power domains comprises respective parameter value fetching circuitry to fetch, upon changing from said non-retaining power state to said retaining power state, a copy of said parameter value along a respective path.

3. Apparatus as claimed in claim 2, wherein said respective paths of said plurality of further power domains form branching paths originating from said master store.

4. Apparatus as claimed in claim 2, wherein said respective paths of said plurality of further power domains form a chain originating from said master store.

5. Apparatus as claimed in claim 2, wherein said respective paths of said plurality of further power domains form a ring comprising said master store.

6. Apparatus as claimed in claim 5, wherein said first power domain has a plurality of power states comprising a non-retaining power state in which said master store to store said master copy of said parameter value does not retain said master copy and a retaining power state in which said master store retains said master copy for use within said first power domain.

7. Apparatus as claimed in claim 6, wherein said first power domain comprises fetching circuitry to fetch, upon changing from said non-retaining power state to said retaining power state, a copy of said parameter value along a path from a slave store within one of said plurality of further power domains.

8. Apparatus as claimed in claim 1, wherein said another of said plurality of further power domains is in a retaining power state whenever said at least one of said further power domains changes from said non-retaining power state to said retaining power state.

9. Apparatus as claimed in claim 1, wherein said fetching circuitry is hardware configured to fetch said parameter value from a predetermined one of said plurality of power domains serving as said another power domain.

10. Apparatus as claimed in claim 1, wherein said fetching circuitry is hardware configured to fetch said parameter value from one of said plurality of power domains serving as said another power domain in accordance with a predetermined preferred ordering of other power domains and in dependence upon which of said other power domains has a slave store storing said parameter value.

11. Apparatus as claimed in claim 1, wherein when said another power domain is in said non-retaining power state as said fetching circuitry of said at least one further power domain attempts to fetch said parameter value, said another power domain is triggered to change from said non-retaining power state to said retaining power state and to fetch said parameter value to said another power domain.

12. Apparatus as claimed in claim 1, wherein said first power domain and said plurality of further power domains each comprise a portion of interconnect circuitry to carry communication therebetween.

13. Apparatus as claimed in claim 12, wherein said parameter value is configures operation of said interconnect circuitry within each of said first power domain and said plurality of further power domains.

14. Apparatus as claimed in claim 1, comprising write propagating circuitry to change any of said further power domains in said non-retaining power state to said retaining power state whenever a write changing said parameter value in said master store is made and to propagate said parameter value to said slave stores within each of said further power domains.

15. Apparatus as claimed in claim 1, write propagating circuitry to propagate, whenever a write changing said parameter value in said master store is made, said parameter value to said slave stores within those of said plurality of further power domains in said retaining power state.

16. A method of processing data comprising the steps of:
storing in a master store of a first power domain a master copy of a parameter value;
performing writes changing said parameter value to said master store; and
operating a plurality of further power domains, each of said further power domains having a plurality of power states comprising a non-retaining power state in which a slave store storing a slave copy of said parameter value does not retain said slave copy and a retaining power state in which said slave store retains said slave copy for use within said further power domain; wherein
fetching circuitry within at least one of said further power domains fetches a copy of said parameter value along a path from a slave store within another of said plurality of further power domains when said at least one further power domain changes from said non-retaining power state to said retaining power state.

* * * * *